United States Patent [19]

Inoue et al.

[11] Patent Number: 4,779,336
[45] Date of Patent: Oct. 25, 1988

[54] PART POSITIONING APPARATUS ASSOCIATED WITH BODY ASSEMBLY INSTALLATION

[75] Inventors: Shinichi Inoue; Motohide Ichikawa, both of Toyota, Japan

[73] Assignee: Toyota Jidosha Kabushiki Kaisha, Japan

[21] Appl. No.: 36,547

[22] Filed: Apr. 9, 1987

[30] Foreign Application Priority Data

Oct. 22, 1986 [JP] Japan ................. 61-250990

[51] Int. Cl.$^4$ ............................. B23P 19/00
[52] U.S. Cl. ............................. 29/799; 29/822; 414/226; 414/753
[58] Field of Search ............... 29/701, 799, 822; 414/225, 226, 750, 751, 753; 901/8, 15, 16

[56] References Cited

U.S. PATENT DOCUMENTS

| | | | |
|---|---|---|---|
| 4,132,318 | 1/1979 | Wang et al. | 901/16 X |
| 4,589,184 | 5/1986 | Asano et al. | 29/799 X |
| 4,589,199 | 5/1986 | Ohtaki et al. | 29/799 X |

FOREIGN PATENT DOCUMENTS 60-252078 12/1985 Japan .

*Primary Examiner*—Timothy V. Eley
*Attorney, Agent, or Firm*—Finnegan, Henderson, Farabow, Garrett and Dunner

[57] ABSTRACT

An apparatus for positioning a part of a body secured to a mount in a vehicle body assembly line is provided wherein a swingable platform is supported for swing motion at one end of a slide base which is moved back and forth by programmable high precision positioning mechanism, such as servo or pulse motor, and a jig pallet designed for a particular vehicle model and having a locator for locating and holding the part in a predeterined attitude is removably engaged by clamps at a free end of the platform, whereby the platform having the jig pallet clamped thereto is rotated such that the part held by the pallet may take an assembly attitude and the slide base is moved to transfer the part to a position for assembly to the body.

7 Claims, 3 Drawing Sheets

PART POSITIONING APPARATUS ASSOCIATED WITH BODY ASSEMBLY INSTALLATION

BACKGROUND OF THE INVENTION

This invention relates to an apparatus for positioning a part of a vehicle body secured to a mount in an automobile assembly line.

An automobile assembly line usually includes plural mounts adapted to hold bodies and the bodies are progressively transferred to a particular assembly station by a transfer device. Also disposed in the assembly station is an apparatus for positioning a part of the body. The part is accurately positioned by the positioning apparatus and attached to the body on the mount by welding robots located at the assembly station along the line, thereby joining the part and the body into a completed body.

Referring to FIG. 2, there is illustrated a prior art positioning apparatus used in placing a rear panel for a particular automobile model at a predetermined attachment position relative to a body held by a mount. The positioning apparatus designated at 1 includes a platform 2 rotatably supported by a pivot 3 and having part locators 2a, 2b for holding a part in the form of a rear panel W in a predetermined attitude. A body 4 is set at a predetermined position on positioning posts 5 of the mount. The part W is placed on and held by the locators 2a, 2b of the platform 2 in a horizontal rest position such that the part W may take a predetermined attitude. The platform 2 having the part W held thereon is then rotated an angle of 90 about the pivot 3 in the direction of arrow A whereupon the part W is moved in place to the rear of the body 4, that is, the part W is placed at a predetermined position with respect to the body 4. A stationary stopper 6 serves to restrict the rotation of the platform 2 at the position of 90° and to hold the rotated platform 2 in vertical orientation.

FIG. 3 shows another prior art positioning apparatus which can accommodate bodies of plural automobile models having different body lengths. The positioning apparatus disignated at 11 includes a frame 12, a slide base 13 mounted on the frame for back and forth sliding motion, and platform 15 supported for rotation on the slide base 13 by a pivot 14. A body 16 on a mount (not shown) is set at a predetermined position. A rear panel part W is placed on and held by part locators 15a, 15b of the platform 15 in a horizontal rest position such that the part W is in a predetermined attitude. The platform 15 having the part W held thereon is then rotated an angle of 90° about the pivot 14 whereupon the part W is placed at a pedetermined position behind the body 16. To accommodate bodies 16a and 16b having different lengths, the slide base 13 is slidingly moved forward (to the left as viewed in FIG. 3). The positions at which the slide base 13 comes to stop upon forward movement are determined by stopper 17 for the body 16a and 18 for the body 16b secured to the frame 12 respectively.

In the positioning apparatus 1 and 11 illustrated in FIGS. 2 and 3, the part locators 2a, 2b and 15a, 15b for holding the part W in the predetermined attitude are fixed to the platforms 2 and 15.

Generally, in a body assembly line with plural automobile models, each mount for mounting a part has a set of switchable locators for locating the part W in the predetermined attitude. These locators are switched in accordance with the body lengths. In such a case, the locators on the mount may desirably be replaced by another set of particular locators corresponding to the length of a particular body in process. FIG. 4 illustrates a further positioning apparatus 21 which is provided with a platform and two locator supports 23 and 24 projected from a platform 22 so as to accommodate bodies of two automobile models having different body lengths and figures. A rotating block 25 having locator 25a and 25b of different lengths and figures is pivotably connected to one locator support 23, and another rotating block 26 having locator 26a and 26b of different lengths and figures is pivotably connected to the other locator support 24. To locate a part W, the locator 25b and 26b are selected. To hold another part (not shown), the rotating block 25 and 26 are turned to index the other locator 25a and 26a.

A further example of prior art positioning apparatus is illustrated in FIG. 5. The positioning apparatus designated at 31 can accommodate bodies of four automobile models having different body lengths and figures. The apparatus includes a platform 32 having two locator supports 33 and 34 projecting therefrom. A rotating block 35 having four radially extending locators 35a, 35b, 35c and 35d of different lengths and figures spaced 90° apart is pivotably connected to one locator support 33, and another rotating block 36 having four radially extending engaging arms 36a, 36b, 36c and 36d of different lengths and figures spaced 90° apart is pivotably connected to the other holder support 34. A first set of locators 35a, 36a is used to hold and position a first part W. For bodies of the other models, the rotating block 35 and 36 are rotated to index any desired set of locators 35b and 36b, 35c and 36c, or 35d and 36d to hold and position a particular part corresponding to the selected body.

The prior art positioning apparatus 1 illustrated in FIG. 2 suffers from the disadvantage that it can deal with only those models having the same body length in the assembly line because the position of the pivot 3 is fixed. Since the locators are fixedly secured to the platform, the entire platform must be replaced to start the production of a new model in the line, requiring a longer time for a larger number of modifications along the line.

The prior art positioning apparatus 11 illustrated in FIG. 3 suffers from the disadvantage that the position of stops 17 and 18 are determined for particular models, modification required to match with a new model of a different body length takes a longer time at more locations along the line.

The prior art positioning apparatus 21 or 31 illustrated in FIG. 4 or 5 can readily meet two or four models by changing locators, but fails to deal with a more variety of models. When the vehicle model is changed, the necessary modification of the positioning apparatus takes a great amount of time and labor and adds to the overall number of modifications.

Japanese Patent Application Kokai No. 60-252078 discloses an apparatus for carrying and positioning window glass. The apparatus includes a conveyor for conveying a body resting thereon, a running rail supported by a parallel rail above the body and adapted to travel along the parallel rail, a carriage adapted to travel along the conveyor, a suction unit for removably holding a piece of window glass, and a press unit for press fitting the window glass. In the window glass mounting step of the production line, this apparatus helps a worker to mount window glass to the body in that it automates those operations which can be performed without man labor and enables one worker to conduct the window glass mounting operation which otherwise needs two workers. With an angle adjustable press unit, the apparatus can readily accommodate a change of model. In the window glass carrying and positioning apparatus, however, the range which can be accommodated by adjusting the angle of the press unit is limited because the window glass held by the suction unit is carried and positioned. It is thus very difficult to apply this positioning apparatus to a body assembly installation.

SUMMARY OF THE INVENTION

An object of the present invention is to provide a new and improved part positioning apparatus associated with a body assembly installation which can be readily and rapidly modified to a change from one model to another model having a different body length and figure.

According to the present invention, there is provided an apparatus for positioning a part in relation to a body secured to a mount in a vehicle body assembly line, comprising a jig pallet designed for a particular vehicle model and having locators and part clamps for locating and holding the part in a predetermined attitude, a swingable platform having locating pins and clamps for removably engaging the jig pallet at a predetermined position, and a slide base having the platform rotatably supported at one end, the slide base being driven for back and forth movement by drive means to carry the part held by the jig pallet to a position for attachment to the body.

BRIEF DESCRIPTION OF THE DRAWINGS

The above and other objects, features, and advantages of the present invention will become more fully understood by reading the following description taken in conjunction with the accompanying drawings, in which.

DESCRIPTION OF THE PREFERRED EMBODIMENTS

Figure 1:
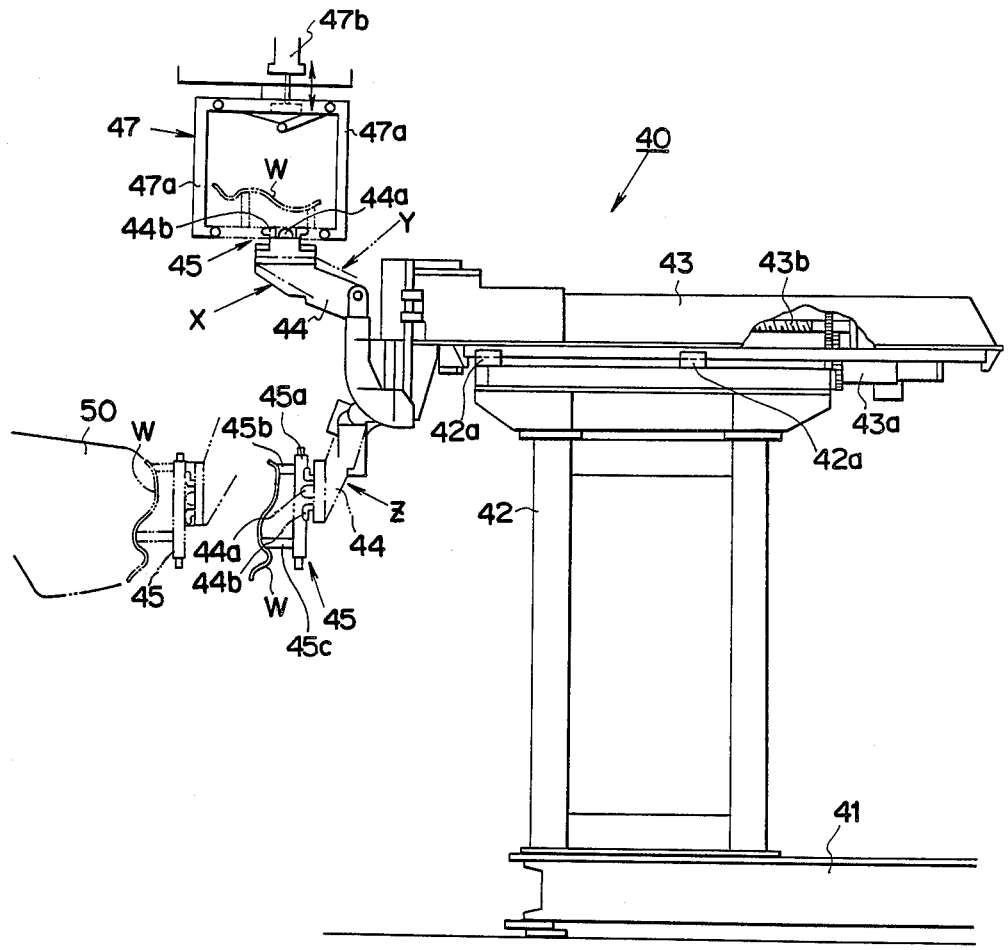
FIG. 1 is a side elevation of a part positioning apparatus according to one embodiment of the present invention.
Figure 2:
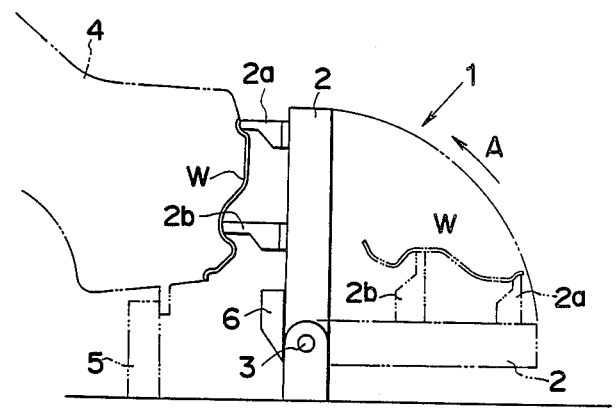
FIG. 2 is a side elevation of a prior art part positioning apparatus.
Figure 3:
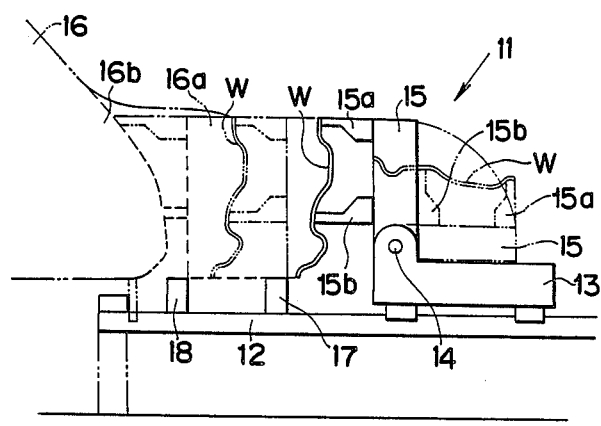
FIG. 3 is a side elevation of another prior art part positioning apparatus.
Figure 4:
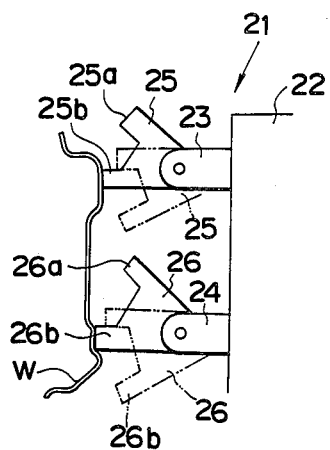
FIG. 4 is a side elevation of a further prior art part positioning apparatus.

Referring to FIG. 1, there is illustrated a part positioning apparatus associated with a body assembly installation according to the present invention. The work positioning apparatus generally designated at 40 is used in combination with a body assembly line having plural mounts, although the line and its components are not shown in the figure. The apparatus includes a frame 42 resting on a base 41 extending parallel to a certain section of the body assembly line, and a slide base 43 mounted for sliding motion on the frame 42 via guides 42a and linear bearings (not shown). The slide base 43 can be moved back and forth in a first or horizontal plane (from right to left and left to right as viewed in FIG. 1) by means of a programmable high precision positioning mechanism, for example, of the type wherein a ball screw 43b is driven by a drive motor 43a in the form of a servo or pulse motor whose quantity of rotation is controllable. The slide base 43 at one end (left end in FIG. 1) has a swingable platform 44 adapted to be vertically moved up and down while rotating about a pivot. More particularly, the swingable platform 44 is supported by an arm which is pivoted to a base of a ball screw driven by a drive motor (not shown) fixedly secured to the end of the slide base 43 and extending in a second or vertical plane. Thus the swingable platform 44 can undergo both swing and linear motions at the same time by virtue of the rotation of the arm and the vertical movement of the base of a ball screw. The swingable platform 44 has at its free end locating pins 44a and clamps 44b which cooperate to removably locate and clamp a jig pallet 45. The clamp 44b may consist of a pair of hooks which are inserted into the jig pallet 45 and then spread apart to clamp the pallet.

The jig pallet 45 is a carrier jig adapted to carry a part W specially designed for a particular vehicle model. The jig pallet 45 includes a plate-like common base 45a and part locators 45b and 45c secured to and extending from the base for holding the part W in a predetermined attitude. Preferably, the locators are removably secured to the common base such that the set of locators may be replaced by a new set of locators matching with a different body length and figure.

The swingable platform 44 pivoted to the end of the slide base 43 rotated in a vertical plane in synchronism with its vertical movement so that the jig pallet 45 is faced horizontal and vertical at the upper and lower limits of the vertical motion, respectively. The lateral position of the swingable platform 44 may be adjusted by laterally moving the slide base 43.

Disposed above the swingable platform 44 is a carrier 47 for carrying the jig pallet 45 and loading it to the swingable platform 44. The carrier 47 includes hangers 47a adapted to travel while suspending the jig pallet 45 by clamping from the opposite sides, and kicker 47b for opening the hangers 47a for unloading the pallet. More particularly, the hangers 47a are pivotably mounted on a horizontally extending pin and engage the jig pallet 45 at their lower ends so that the weight of the jig pallet 45 causes to close the lower ends of the hangers 47a to eventually clamp the pallet. The kicker 47b is actuated by a suitable actuator such as a pneumatic cylinder to urge downward the upper ends of the hangers 47a to turn the hangers so as to spread apart their lower ends.

with the above construction, the positioning apparatus 40 will operate as follows.

The jig pallet 45 having the part W held thereon is carried to a predetermined position by the carrier 47 whereupon the carrier 47 is stopped. The swingable platform 44 which has been at the stand-by position of the positioning apparatus 40 (depicted in solid lines and designated at X in FIG. 1) is moved upward to the upper limit (depicted in dot-and-dash lines and designated at Y in FIG. 1) where the clamp 44b clamps the jig pallet 45 suspended by the carrier 47 so that the pallet lies horizontally. At this point, the jig pallet 45 having the part W held thereon is positioned by the locating pin 44a and fixedly grasped by the clamp 44b.

Once the jig pallet 45 is fastened to the swingable platform 44 by the clamp 44b, the kicker 47b is actuated to open the hangers 47a of the carrier 47 whereupon the jig pallet 45 having the part W held thereon is delivered to the platform 44.

The swingable platform 44 having received the jig pallet 45 is then translated and rotated 90° downward in a vertical plane from the upper limit or horizontal position to the lower limit or vertical position (depicted with dot-and-dash lines and designated at Z in FIG. 1) where the jig pallet 45 is oriented in such attitude that the swingable platform 44 extends vertically and the locators 45b and 45c project horizontally forward with the part W held thereby facing forward.

When the swingable platform 44 reaches its lower limit, the slide base 43 begins moving forward to a stop position. This stop position is previously programmed so as to match with the normal set position of the body 50 on the mount (not shown). In this way, the part W held by the jig pallet 45 is carried and positioned in place behind the body 50.

Once the part W is positioned, a welding robot (not shown) begins operation for attachment of the part W to the body 50. At the end of welding operation of the part W to the body 50, the part W is released from the jig pallet 45. The slide base 43 is then retracted to its rear limit whereupon the swingable platform 44 is swung and translated upward to its upper limit Y whereupon the jig pallet 45 fastened to the swingable platform 44 by the clamp 44b is engaged by the hangers 47a of the carrier 47. Suspension of the jig pallet 45 by the hangers 47a is accomplished by their closure at the same time as grasp of the jig pallet 45 by the clamp 44b is released. Then the swingable platform 44 is somewhat lowered to the stand-by position X.

When it is desired to position a body of another model having different body configuration and length from the previously manipulated bodies, another jig pallet 45 specially designed for the other model delivered from the carrier 47 to the swingable platform 44 and another previously programmed stop position is assigned to the slide base 43. Replacement of the jig pallet 45 and selection of the stop position of the slide base 43 provides for assembly of bodies of a variety of vehicle models.

When bodies of two or more models having different body lengths and figures are carried in the same assembly line, works may be positioned in relation to the different bodies merely by changing the stop position of the slide base 43.

At the time of a vehicle model change, replacement of the jig pallet 45 for the new body configuration and reprogramming of the drive section of the slide base 43 for the new body length provides for assembly of bodies of the new model. The time required for modifying the assembly line to accord with the model change can be shortened because of elimination of substantial modification of the installation.

Even when body-constituting panel parts have some tolerance variations, the apparatus of the invention can absorb such variations by programming the stop position of the slide base 43.

Figure 5:
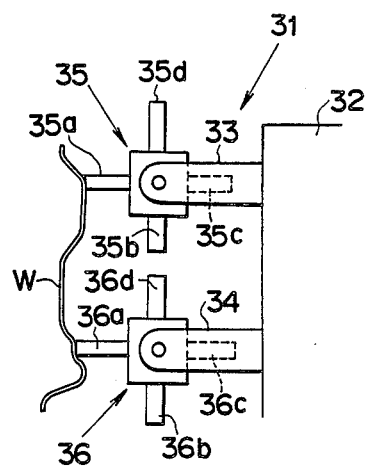
FIG. 5 is a side elevation of the rest prior art part positioning apparatus.

Similar results are obtained when the locators 45b, 45c of the part positioning apparatus 40 illustrated in FIG. 1 are replaced by the conventional indexing type locators in the form of a support having four locators of different lengths as shown in FIG. 5.

As described above, the part positioning apparatus of the present invention including a jig pallet and a swingable platform which are formed as disengageable separate elements can deal with plural models having different body lengths at a full degree of freedom and accommodate plural models having different body configurations simply by replacing the jig pallet. The possible program setting of motion of the slide base enables the stop position to be set at any desired point. As a result, the dead time due to a vehicle model change can be shortened and the modifying operation associated with the model change can be reduced. An additional benefit is that the apparatus can cope with tolerance variations of body-constituting panel parts.

As many apparently widely different embodiments of the invention may be made without departing from the spirit and scope thereof, it is to be understood that the invention is not limited to the specific embodiments thereof except as defined in the appended claims.

We claim:

1. An apparatus for positioning a body part in a vehicle assembly line, comprising:
   a jig pallet designed for a particular vehicle model and having means for holding the part in a predetermined attitude;
   a swingable platform having at a free end clamps for removably engaging said jig pallet at a predetermined position;
   a slide base having said swingable platform supported at one end of said base such that said swingable platform may be rotated and linearly moved, said slide base being driven for back forth movement by drive means to carry the part held by said jig pallet to a stop position for attachment to the body; and
   a carrier for delivering said jig pallet to said swingable platform, said carrier including a pair of hangers for clamping said jig pallet and a kicker for opening the hangers to disengage the jig pallet.

2. The part positioning apparatus of claim 1 wherein said swingable platform is moved between an upper limit where said swingable platform receives the jig pallet and a lower limit where said platform positions the part held by the jig pallet to the body.

3. The part positioning apparatus of claim 1 wherein said clamps include at least one locating pin for locating the jig pallet and said clamps for removably engaging the jig pallet.

4. The part positioning apparatus of claim 2 wherein said swingable platform is rotatable 90° between the upper limit and the lower limit.

5. The part positioning apparatus of claim 1 wherein said drive means comprises a high precision positioning mechanism having a motor with a controllable amount of rotation and a ball screw rotatably connected to said motor.

6. The part positioning apparatus of claim 5 wherein the stop position of said slide base is operative to be program set.

7. The part positioning apparatus of claim 1 wherein said jig pallet comprises a common base adapted to be clamped to said swingable platform and a part locator provided on the common base for locating and holding the part in a predetermined attitude.

* * * * *